March 10, 1964     J. A. RONNING ET AL     3,124,630
METHOD OF PRODUCING COUPLING WASHER-EQUIPPED FILTERING SCREENS
Filed Oct. 25, 1957
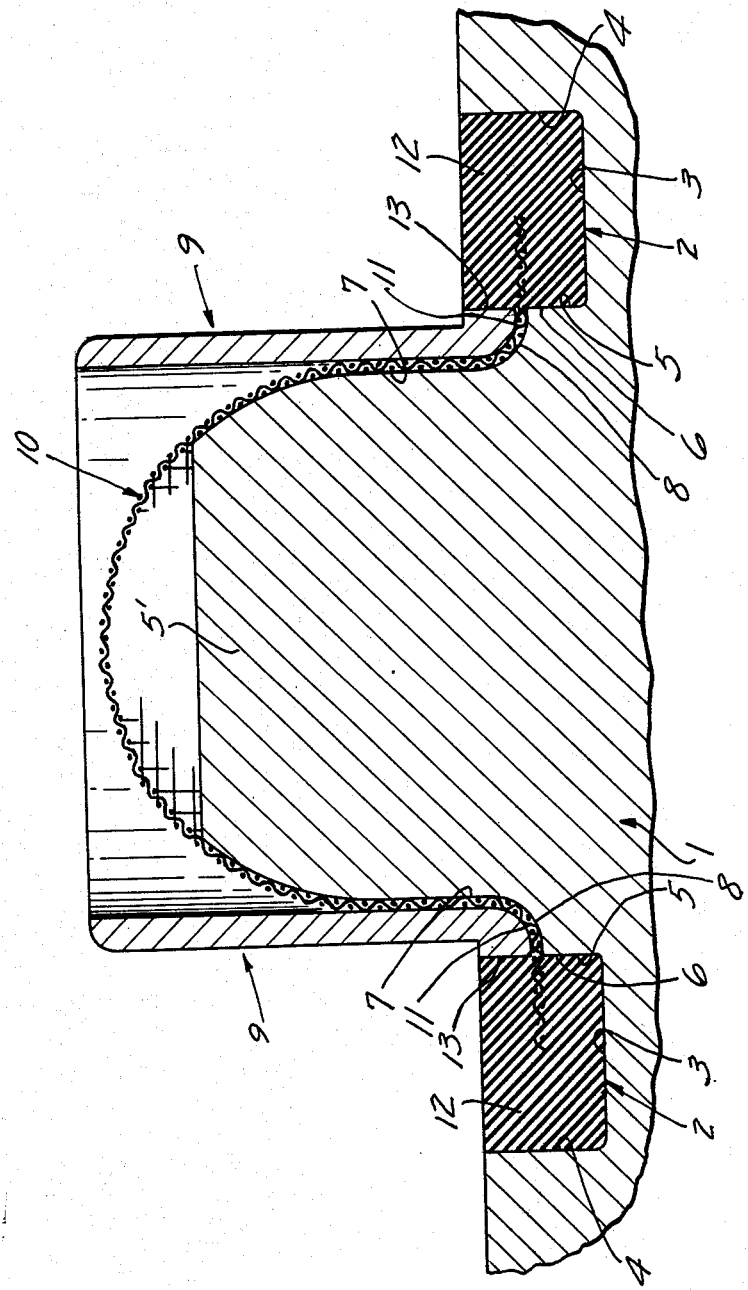
INVENTORS
JACOB A. RONNING
MERLE A. VIKRE
BY
*Merchant & Merchant*
ATTORNEYS

United States Patent Office 3,124,630
Patented Mar. 10, 1964

3,124,630
METHOD OF PRODUCING COUPLING WASHER-EQUIPPED FILTERING SCREENS
Jacob A. Ronning and Merle A. Vikre, Minneapolis, Minn., assignors to Ron-Vik, Inc., Minneapolis, Minn., a corporation of Minnesota
Filed Oct. 25, 1957, Ser. No. 692,310
10 Claims. (Cl. 264—276)

Our present invention relates to an improved method of producing resilient coupling washer-equipped filtering screens of the kind wherein a marginal portion of a filtering screen is molded in a resilient annular washer adapted for use as a conduit coupling washer.

An important objective of the instant invention is the provision of an improved method for producing coupling washer-equipped filtering screens of the character described from a suitably formed screen element and a suitable liquid material that is converted to a resilient solid state suitable for use as a filtering washer without producing an objectionable "flash," which latter is a thin film of the washer material extending from the main body of the washer over an adjacent portion of the screen and thereby reducing the useful area of the screen; such objectionable "flash" being due to the tendency of the liquid material to flow from the main body thereof over adjacent areas of the screen due to capillary attraction, gravity, or a combination of capillary attraction and gravity, between the time the liquid material is initially introduced into the mold and the time it has been brought up to a temperature sufficient to cause such partial curing or setting thereof as will stop further flow.

The above and other highly important objects and advantages of the invention will be made apparent from the following specification, claims and the appended drawings.

Referring to the drawings:
The single figure is an enlarged axial sectional view of a mold having a filtering screen and the washer-forming material operatively positioned therein as for the curing operation; this view also being representative of a completed coupling washer-equipped filtering screen.

A preferred embodiment of our improved method comprises steps as follows:

(1) A first step in the method comprises the provision of a suitable mold. A preferred form of mold illustrated, and which is for use in carrying out a preferred embodiment of our method, comprises a main mold body 1 defining a vertical axis, open-topped, annular mold cavity 2. The mold cavity 2 is defined by an annular bottom wall 3, a generally circular outer wall 4 and a generally circular inner wall 5. Preferably and as illustrated, the inner wall of the mold cavity 2 comprises concentric lower and upper wall portions 6 and 7, the latter of which is of reduced diameter with respect to the former and is connected thereto by a shoulder 8 disposed above the plane of the bottom wall 3 and closely adjacent the vertical center of the filtering washer to be produced. Also, preferably and as illustrated, the mold further comprises an outer auxiliary annular element 9.

The mold illustrated is designed for use in the production of a washer-equipped filtering screen of a preferred form but may, obviously, be modified and designed for use in the production of washer-equipped filtering screens having different design characteristics. The preferred form of filtering screen illustrated is formed of woven wire of relatively fine mesh. This filtering screen is indicated as an entirety by 10 and is of concavo-convex formation provided at its base portion with a radially outturned annular anchoring flange 11. The numeral 12 indicates the liquid material from which the coupling washer is produced and is also indicative of the completed or cured coupling washer.

The two-diameter inner wall 5 of the mold body 1 is formed as a solid stud-like projection or mandrel 5' integral with the mold body and extends to a level above the plane of the top of the outer wall 4 of the mold cavity. The reduced diameter upper portion of the inner wall 5 is sized and contoured to snugly and telescopically receive the concavo-convex portion of the screen 10 so as to be in heat-conducting relationship therewith when the annular anchoring flange 11 of said screen is seated upon the mold shoulder 8 so as to be in heat-conducting relationship with the latter.

The annular outer or auxiliary element 9 is internally sized and contoured to snugly receive the lower or base portion of the concavo-convex screen 10 and to fit snugly against the radially inner portion of the screen anchoring flange 11 and has an outer wall portion 13 which, when the element 9 is operatively positioned as in the drawing, is aligned with and forms an extension of the lower portion 6 of the inner wall 5 of the mold body 1 and together with said wall portion 6 then defines the upper portion of the inner wall of the mold cavity 2. Preferably, this wall portion 13 of the auxiliary element 9 extends substantially to the plane of the outer wall 4 of the mold cavity 2.

(2) The next step in the method comprises positioning the preformed screen 10 in the operative relationship to the mold shown in the drawing wherein the said screen is in snug heat-conducting relationship with the inner wall 7 and shoulder 8 of the mold body 1 and wherein the screen anchoring flange 11 projects radially into the mold cavity 2 and is positioned at the approximate axial center thereof; the auxiliary mold element 9 being assembled over the screen either before or after assembly of the screen on the main mold body 1, and being, of course, in snug heat-conducting relationship with the screen.

As previously indicated, the material from which the coupling washer 12 is to be formed is a liquid material which converts to a resilient solid state upon subjection to an established relatively high curing temperature for an established period of time, which latter is at least sufficient to bring the entire body of the liquid to the required temperature. Such materials generally have a strong capillary attraction to the screen which tends to produce a flow thereof over screen areas adjacent the mold cavity during the period that the material is in a free-flowing liquid state. In preferred practice we employ for production of the coupling washer 12 a resinous liquid composition containing polyvinyl chloride; some such materials being converted or cured to a resilient solid state suitable for use as a conduit coupling washer upon subjection to a curing or fusing temperature in the range of 325° F. to 400° F., for example, and being partially cured to a point where they are no longer free-flowing by subjection to a lower temperature in the range of 200° F. to 225° F., for example.

(3) The next step in the preferred method comprises preheating the mold together with the assembled screen 12 and auxiliary mold element 9 to an elevated temperature usually below the ultimate curing or fusing temperature of the particular material 12 and which may, for the purpose of illustration, be in the range of 200° F. to 225° F. This preheating step may be carried out by suitable heating means such as an oven, for example.

(4) The next step in the method comprises introduction into the mold cavity, to the approximate level indicated, of the liquid material 12 while the mold and screen are still at a sufficiently elevated temperature to cause rapid curing, or semi-curing, and resultant congealing of the liquid material at areas of intimate contact with the heated screen and mold to stop flow of the material 12 over screen areas immediately adjacent the mold cavity. It will, of course, be apparent that, even when the auxiliary element 9 is employed and positioned as in the drawing, a thin film of the liquid material will tend to flow, by capillary attraction, gravity, or a combination of gravity and capillary attraction, outwardly of the mold cavity between the mold body 1 and auxiliary mold element 9 to produce what has been referred to as "flash" that plugs and renders useless a portion of the screen depending upon the extent of the "flash" produced. However, by employing this preheating step described this "flash" producing flow of liquid material is stopped almost immediately and reduced to inconsequential proportions. If the preheating step is carried out in an oven, then this step of introduction of the fluid material into the mold is preferably carried out as soon as possible after extraction of the mold and screen from the oven. While this step of introduction of the liquid material into the mold may be accomplished in different ways, it can, due to the free-flowing nature of the material, be accomplished by flowing the material into the mold under the action of gravity.

While the temperature involved in the preheating step will not, in accordance with the present example, be sufficient to produce complete and final curing of the entire body of liquid within the mold cavity or in most cases even sufficient to reduce the main body of material to a non-free-flowing state, it will nevertheless be sufficient to reduce to a non-free-flowing state thin films of material in intimate contact with the mold and screen.

(5) The next step in the method comprises subjection of the mold and screen to an established relatively high final curing or fusing temperature for an established period of time necessary to convert the entire body of initially free-flowing liquid material 12 into a resilient solid state such as is suitable for use as a conduit coupling washer; a temperature in the range of 325° F. to 400° F. being suitable with some materials and of course varying with different materials, with molds of different mass volumes and materials, and depending further upon the temperature of the mold, screen and material at the time the final curing operation is commenced. In fact, these factors will influence both the time and the temperature of the final curing operation. It is recommended that the manufacturers' recommendations be employed as a guide in arriving at time and temperature for the final curing operation and also for the preheating step, although the latter in particular can usually best be obtained by experiment.

(6) The final step in the method comprises the removing of the completed product from the mold, and this is usually best carried out after first allowing the washer material to cool somewhat below its critical temperature or to a reduced temperature whereat it can safely be removed without distortion or other harmful effects.

It should be appreciated that the auxiliary mold element 9 cooperates with the mandrel portion 5' of the mold body to accurately size and shape the screen element 10 and to maintain the screen in such accurately sized and shaped condition during the curing operation. This is important because the screens, often being formed of very fine wire are very easily distorted between the time of their original forming and the time they are placed in the mold. When these distorted screens are telescopically applied over the mandrel 5' much of the distortion will be removed and when the snugly-fitting auxiliary element 9 is then forced over the outer surface of the screen any remaining distortion will be removed and the outturned flange portion 11 of the screen will be positively seated against the mold shoulder 8.

It should be obvious that satisfactory operation of the open-topped mold illustrated requires that it be maintained in a level condition.

It is to be understood that the form of the invention herein illustrated and described is to be taken as a preferred embodiment of the invention and that various changes may be made without departing from the spirit of the invention and scope of the appended claims.

What we claim is:

1. A method of producing a combined filter screen and coupling washer comprising steps as follows: forming a concavo-convex filter screen having an integral annular anchoring flange projecting outwardly from its base portion; providing a mold having a body comprising an open-topped vertical axis annular cavity, said cavity being defined by concentric inner and outer walls and a bottom wall, the outer wall of the cavity being of a diameter greater than the outside diameter of the screen anchoring flange and having a depth at least equal to the thickness of the filtering washer to be produced, the inner wall of the mold cavity being of a diameter to snugly receive and be in heat-conducting relationship with the base portion of the concavo-convex filtering screen and having a depth greater than the thickness of the filtering washer to be produced; telescopically applying the base portion of the concavo-convex screen over the inner cavity-defining wall with its anchoring flange spaced from the bottom of the cavity and its lower internal portion in heat-conducting relationship with said inner wall, preheating the mold and screen to an elevated temperature, while the mold and screen are at a suitably elevated temperature filling the mold cavity to a desired level above the top of the screen anchoring flange with a liquid material of a character that is free-flowing at room temperature but is converted to a resilient solid state upon subjection to an elevated temperature, the elevated temperature of the mold and screen resulting from preheating and present at the time of introduction of the liquid material into the mold being sufficiently high to cause rapid semi-hardening of the liquid material at areas of contact with the screen such as to stop flow of material over the surface of the screen by capillary action, subsequently subjecting the mold and screen together with the liquid material to such an elevated temperature and for such time as is necessary to convert the entire body of said material to a resilient solid state suitable for use as a conduit coupling washer, and finally removing the washer-equipped filtering screen from the mold.

2. A method of producing a combined filter screen and coupling washer comprising steps as follows: forming a concavo-convex filter screen having an integral annular anchoring flange projecting outwardly from its base portion; providing a mold having a body comprising an open-topped vertical axis annular cavity, said cavity being defined by concentric inner and outer walls and a bottom wall, the outer wall of the cavity being of a diameter greater than the outside diameter of the screen anchoring flange and having a depth at least equal to the thickness of the filtering washer to be produced, the inner wall of the mold cavity being of a diameter to snugly receive and be in heat-conducting relationship with the base portion of the concavo-convex filtering screen and having a depth at least equal to the thickness of the filtering washer to be produced; telescopically applying the base portion of the concavo-convex screen over the inner cavity-defining wall with its anchoring flange spaced from the bottom of the cavity and its lower internal portion in heat-conducting relationship with said inner wall, telescopically applying about the base portion of the concavo-convex screen adjacent to the screen anchoring flange and in contact with said screen anchoring flange an annular metallic element comprising an auxiliary part of a mold and extending to a height at least equal to the plane of the top of the filter washer to be produced and being in heat-conducting relationship with the screen, whereby flow of fluid material over the surface of that portion of the screen lying between the mold body and said auxiliary mold element will be reduced to a thin rapidly heatable film, preheating the mold and screen to an elevated temperature, while the mold and screen are at said elevated temperature filling the mold cavity to a desired level above the top of the screen anchoring flange with a liquid material of a character that is free-flowing at room temperature but is converted to a resilient solid state upon subjection to an elevated temperature, the elevated temperature of the mold and screen resulting from preheating and present at the time of introduction of the liquid material into the mold being sufficiently high to cause rapid hardening to a non-flowing state of the thin film of liquid material tending to flow over that portion of the screen lying between the said mold body and the said auxiliary mold element, subsequently subjecting the mold and screen together with the liquid material to such an elevated temperature for such time as is necessary to convert the entire body of said material to a resilient solid state suitable for use as a conduit coupling washer, and finally removing the washer-equipped filtering screen from the mold.

3. A method of producing a combined filter screen and coupling washer comprising steps as follows: forming a concavo-convex filter screen having an integral annular anchornig flange projecting radially outwardly from its base portion; providing a mold having a body defining an open-topped vertical axis annular cavity, said cavity being defined by concentric inner and outer walls and a bottom wall, the outer wall of said cavity being of a diameter greater than the outside diameter of the screen anchoring flange and having a depth at least equal to the thickness of the filtering washer to be produced, the bottom wall of said cavity being relatively flat and generally normal to the axis of the cavity, the inner wall of the cavity comprising a lower cylindrical portion of a diameter less than the maximum diameter of the screen anchoring flange and projecting upwardly from the bottom wall to a plane intermediate the plane of the bottom wall and the plane of the upper end of the outer wall and an upper portion adapted to be received snugly in the concavo-convex filtering screen and projecting upwardly at least to the plane of the top of the washer to be produced, and a horizontally disposed relatively flat shoulder connecting the upper end of the lower portion of the inner wall and the lower portion of the upper end of the inner wall; placing the lower portion of the filtering screen in the mold cavity with its said anchoring flange seated on said mold shoulder, preheating the mold and screen to an elevated temperature, while the mold and screen are at an elevated temperature filling the mold cavity to a desired level above the top of the screen anchoring flange with a liquid material of a character that is free-flowing at room temperature but is converted to a resilient solid state upon subjection to an elevated temperature, the elevated temperature of the mold and screen at the time of introduction of the liquid material into the mold being sufficiently high to cause rapid hardening of the liquid material at areas of contact with the mold and screen such as to stop flow of the material over the surfaces of the mold and screen by capillary action, subsequently subjecting the mold and screen together with the said liquid material to further elevated temperature for such time as is necessary to convert the entire body of said material to a resilient solid state suitable for use as a conduit coupling washer, and finally removing the washer-equipped filtering screen from the mold.

4. A method of producing a combined filter screen and coupling washer comprising steps as follows: forming a concavo-convex filter screen having an integral annular anchornig flange projecting radially outwardly from its base portion; providing a mold having a body defining an open-topped vertical axis annular cavity, said cavity being defined by concentric inner and outer walls and a bottom wall, the outer wall of said cavity being of a diameter greater than the outside diameter of the screen anchoring flange and having a depth at least equal to the thickness of the filtering washer to be produced, the bottom wall of said cavity being relatively flat and generally normal to the axis of the cavity, the inner wall of the cavity comprising a lower cylindrical portion of a diameter less than the maximum diameter of the screen anchoring flange and projecting upwardly from the bottom wall to a plane intermediate the plane of the bottom wall and the plane of the upper end of the outer wall and an upper portion adapted to be received snugly in the concavo-convex filtering screen and projecting upwardly at least to the plane of the top of the washer to be produced, and a horizontally disposed relatively flat shoulder connecting the upper end of the lower portion of the inner wall and the lower portion of the upper end of the inner wall; placing the lower portion of the filtering screen in the mold cavity with its said anchoring flange seated on said mold shoulder, telescopically applying about that portion of the screen surrounding the upper portion of the inner wall of the mold and in heat-conducting relationship therewith and seated against that portion of the screen flange overlying said mold shoulder an annular metallic element comprising an auxiliary part of the mold and extending upwardly at least to the plane of the top of the filter washer to be produced, preheating the mold and screen to an elevated temperature, while the mold and screen are at an elevated temperature filling the mold cavity to a desired level above the top of the screen anchoring flange with a liquid material of a character that is free-flowing at room temperature but is converted to a resilient solid state upon subjection to an elevated temperature, adjacent portions of the mold body and auxiliary mold element lying on opposite sides of the screen restricting flow of the liquid material to a thin rapidly heated film and the elevated temperature of the mold and screen at the time of introduction of the liquid material into the mold being sufficiently high to cause rapid hardening of such thin film of material as will stop flow thereof, subjecting the mold and screen together with said liquid material to final elevated temperature for such time as is necessary to convert the entire body of said material to a resilient solid state suitable for use as a conduit coupling washer, and finally removing the washer-equipped filtering screen from the mold.

5. A method of producing a combined filter screen and coupling washer comprising steps as follows: producing a filter screen of desired shape and having a marginal edge portion, providing a mold body defining an upwardly open annular cavity and screen engaging portions adjacent the cavity, positioning the said marginal edge portion of the screen in the mold cavity in spaced relation to the bottom thereof with portions of the mold immediately adjacent the mold cavity in contact with the screen, preheating the mold and screen to an elevated temperature, while the mold and screen are at an elevated temperature filling the mold cavity to a desired level above the top of the said marginal edge portion of the screen with a free-flowing liquid material that is converted to a resilient solid state upon subjection to an elevated temperature, the elevated temperature of the mold and screen resulting from preheating and present at the time of introduction of the liquid into the mold cavity being sufficiently high to cause rapid hardening of the liquid material at areas of contact with portions of the screen immediately adjacent the mold cavity such as to stop flow of the material over the surface of the screen, subjecting the mold and screen together with the liquid material to a final elevated temperature for such time as is necessary to convert the entire body of said material to a resilient solid state suitable for use as a conduit coupling washer, and finally removing the washer-equipped filtering screen from the mold.

6. The method defined in claim 5 wherein the mold comprises annular portions engaging opposite sides of the screen immediately adjacent the mold cavity which, when preheated, very rapidly transfer such heat to cause congealing of such thin film of liquid material as tends to flow therebetween from the mold cavity as to quickly harden the same to a non-flowing state.

7. The method defined in claim 1 in which the liquid material is a resinous composition containing polyvinyl chloride.

8. The method defined in claim 2 in which the liquid material is a resinous composition containing polyvinyl chloride.

9. The method defined in claim 3 in which the liquid material is a resinous composition containing polyvinyl chloride.

10. The method defined in claim 4 in which the liquid material is a resinous composition containing polyvinyl chloride.

References Cited in the file of this patent

UNITED STATES PATENTS

| 2,335,222 | Storch | Nov. 23, 1943 |
| 2,588,571 | Porter | Mar. 11, 1952 |
| 2,732,031 | Rabbitt et al. | Jan. 24, 1956 |
| 2,858,575 | Burdick | Nov. 4, 1958 |

FOREIGN PATENTS

| 459,514 | Canada | Sept. 6, 1949 |
| 289,921 | Switzerland | July 16, 1953 |

OTHER REFERENCES

Plastic Engineering Handbook, 1954, pages 92 and 494.